United States Patent
Lee et al.

(10) Patent No.: US 9,317,320 B2
(45) Date of Patent: *Apr. 19, 2016

(54) HYPERVISOR-BASED SERVER DUPLICATION SYSTEM AND METHOD AND STORAGE MEDIUM STORING SERVER DUPLICATION COMPUTER PROGRAM

(71) Applicant: SAMSUNG SDS CO., LTD.

(72) Inventors: Kwang-Hyun Lee, Seoul (KR); Jong-Song Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,030

(22) Filed: Feb. 23, 2015

(65) Prior Publication Data

US 2015/0178119 A1    Jun. 25, 2015

Related U.S. Application Data

(63) Continuation of application No. 13/759,336, filed on Feb. 5, 2013, now Pat. No. 8,997,098.

(30) Foreign Application Priority Data

Oct. 31, 2012    (KR) ........................ 10-2012-0122393

(51) Int. Cl.
G06F 9/455    (2006.01)
G06F 11/14    (2006.01)
G06F 11/20    (2006.01)

(52) U.S. Cl.
CPC ........ *G06F 9/45558* (2013.01); *G06F 9/45533* (2013.01); *G06F 11/1484* (2013.01);

(Continued)

(58) Field of Classification Search
None
See application file for complete search history.

(56) References Cited

U.S. PATENT DOCUMENTS 8,041,987 B2    10/2011    Allen et al.
8,145,945 B2    3/2012    Lee
(Continued)

FOREIGN PATENT DOCUMENTS

EP              2 423 814 A1    2/2012
KR    10-2011-0035949 A        4/2011
(Continued)

OTHER PUBLICATIONS

Communication dated Oct. 24, 2013, issued by the European Patent Office in counterpart European Patent Application No. 13153321.8.

(Continued)

*Primary Examiner* — Dong Kim
(74) *Attorney, Agent, or Firm* — Sughrue Mion, PLLC

(57) ABSTRACT

Disclosed herein are a server duplication system and method and a storage medium storing a server duplication computer program. The server duplication system includes a primary server including a hypervisor including a hypervisor-based fault tolerance module and a first file system virtual machine (FS VM), and a first standby server including a hypervisor including a hypervisor-based fault tolerance module that exchanges data with a fault tolerance module provided on the hypervisor of the primary server and duplicates the primary server. The first FS VM provides a first file system that is shared by a user virtual machine (USER VM), and a buffer cache that is used in conjunction with the first file system is provided on virtual memory. The first FS VM is duplicated into the standby server using the hypervisor-based fault tolerance module of the primary server and the hypervisor-based fault tolerance module of the standby server.

13 Claims, 14 Drawing Sheets

(52) U.S. Cl.
CPC ........ *G06F11/2038* (2013.01); *G06F 11/2056* (2013.01); *G06F 11/2097* (2013.01); *G06F 11/2041* (2013.01); *G06F 2009/45562* (2013.01); *G06F 2201/815* (2013.01)

(56) References Cited

U.S. PATENT DOCUMENTS

| | | |
|---|---|---|
| 2007/0050767 A1 | 3/2007 | Grobman et al. |
| 2007/0143340 A1 | 6/2007 | Lee et al. |
| 2011/0022574 A1* | 1/2011 | Hansen ............... G06F 11/2097 707/698 |
| 2011/0078681 A1 | 3/2011 | Li et al. |
| 2011/0119669 A1 | 5/2011 | McRae |
| 2011/0197039 A1* | 8/2011 | Green .................... G06F 3/0617 711/162 |
| 2012/0054409 A1* | 3/2012 | Block ................. G06F 11/1484 711/6 |
| 2012/0137173 A1* | 5/2012 | Burshan .............. G06F 9/45533 714/15 |
| 2013/0282994 A1 | 10/2013 | Wires et al. |

FOREIGN PATENT DOCUMENTS

| | | |
|---|---|---|
| KR | 20110055391 A1 | 5/2011 |
| KR | 10-1107899 B1 | 1/2012 |
| KR | 20120016298 A1 | 2/2012 |
| WO | 2011081888 A1 | 7/2011 |

OTHER PUBLICATIONS

Communication, dated Jul. 31, 2014, issued by the KIPO in counterpart Patent Application No. 10-2012-0122393.

Communication, Issued by the Korean Intellectual Property Office, Dated Nov. 27, 2014, in counterpart Korean Application No. 10-2012-0122393.

* cited by examiner

HYPERVISOR-BASED SERVER DUPLICATION SYSTEM AND METHOD AND STORAGE MEDIUM STORING SERVER DUPLICATION COMPUTER PROGRAM

CROSS-REFERENCE TO RELATED APPLICATION

This application is a continuation of U.S. application Ser. No. 13/759,336, filed Feb. 5, 2013, which claims priority from Korean Patent Application No. 10-2012-0122393 filed on Oct. 31, 2012 in the Korean Intellectual Property Office, the contents of all of which in their entirety are herein incorporated by reference.

BACKGROUND OF THE INVENTION

1. Field of the Invention

The present invention relates generally to a server duplication system and method and a storage medium storing a server duplication computer program and, more particularly, to a server duplication system and method and a storage medium storing a server duplication computer program, which are capable of increasing response speed when a virtual machine (VM) invokes a file input/output call upon duplicating a server in which one or more virtual machines (VMs) have been generated on a hypervisor.

2. Description of the Related Art

A conventional type of server duplication is performed in such a way that data is stored in shared storage, one of two or more servers runs an application, and a standby server runs the application and then continues service when the former server crashes. This method has the problem that service is interrupted during a period from the time at which a crash occurs to the time at which the application is ready to run on the standby server.

Accordingly, a fault tolerance (FT) technology is provided that duplicates not only data but also a CPU, memory and a network device. Since not only the data but also the CPU is duplicated, every server may run an application and perform service. This type of fault tolerance technology utilizes a method of performing real-time duplication using a fault-tolerance hardware module or a hypervisor-based duplication method. Although the hardware-based duplication method has excellent performance, it requires firmware-level control in connection with duplication, and thus has the problem of having to include high-cost hardware.

FIG. 1 is a diagram showing the configuration of a system to which the conventional hypervisor-based fault tolerance technology has been applied. With the advent of hypervisor technology, a plurality of virtual servers could be provided by generating a plurality of virtual machines in a single physical server. This technology may be applied to, for example, the field of cloud computing. For example, a cloud computing service user may reduce the server management cost by setting up a virtual machine that has allocated resources appropriate for its needs in a physical server device provided by a service administrator. The hypervisor-based fault tolerance technology is provided in order to provide High Availability (HA) to the service administrator.

As shown in FIG. 1, the hypervisor-based fault tolerance technology duplicates virtual resources at the hypervisor level, thereby achieving the advantage of duplicating a primary server into a standby server. That is, in the system to which the hypervisor-based fault tolerance technology has been applied, FT modules provided in the hypervisors of the primary and standby servers synchronize virtual resources that are managed by both the hypervisors. The virtual resources may include, for example, the register values of a virtual CPU, the data of virtual memory, the data of virtual storage, etc.

Meanwhile, since the hypervisor-based fault tolerance technology requires that the synchronization of virtual resources takes a long time, the problem occurs that a task, particularly a task requiring the synchronization of a storage device having a low operating speed, takes a long time to return a kernel service function. This will be described in greater detail below with reference to FIG. 2.

FIG. 2 is a signal flow diagram showing the processing of a data write call that is performed by a system to which the hypervisor-based fault tolerance technology has been applied, when the data write call is invoked during the execution of an application that runs on a primary VM running on a primary server.

First, when the primary VM requests the primary hypervisor of the primary server to write data, an FT module provided in the primary hypervisor of the primary server requests synchronization Sync from the FT module of the standby hypervisor of a standby server. The standby hypervisor of the standby server receives the synchronization request signal, and requests an update from the standby VM of the standby server.

The virtual machine of the standby server again performs the operation in which the application that runs in the virtual machine of the primary server invokes the data write call. That is, the virtual machine of the standby server requests the hypervisor of the standby server to write data, and the hypervisor of the standby server actually writes the data in the standby HDD of the standby server. After the data has been written on the standby HDD of the standby server, the virtual machine of the standby server returns the update (Update_Ack). Furthermore, the hypervisor returns the synchronization request of the standby server (Sync_Ack).

Thereafter, the primary hypervisor of the primary server also physically writes data in the primary HDD of the primary server. After the data has been written on the primary HDD of the primary server, the data write call from the virtual machine of the primary server is finally returned.

As shown in FIG. 2, the system to which the hypervisor-based FT technology has been applied has the problem that the operating speed is reduced particularly in a task involving low-speed storage device synchronization.

SUMMARY OF THE INVENTION

Accordingly, the present invention has been made keeping in mind the above problems occurring in the prior art, and an object of the present invention is to provide a hypervisor-based server duplication system that is capable of improving data input and output operating speeds with respect to a storage device.

Another object of the present invention is to provide a hypervisor-based server duplication method that is capable of improving data input and output operating speeds with respect to a storage device.

Still another object of the present invention is to provide a computer-readable storage medium storing a computer program that performs the hypervisor-based server duplication method that is capable of improving data input and output operating speeds with respect to a storage device.

Still another object of the present invention is to provide a virtual machine provision system that is capable of improving data input and output operating speeds with respect to a storage device.

The objects of the present invention are not limited to the above-described objects, and other objects of the present invention will be apparent from the following description.

In order to accomplish the above objects, the present invention provides a computer-readable storage medium storing a computer program that performs generating a first file system virtual machine (FS VM) on a hypervisor of a primary server, installing a predetermined file system in the first FS VM, and disposing a buffer cache, operating in conjunction with the file system, in virtual memory allocated to the first FS VM; generating a user virtual machine (USER VM) on the hypervisor so that the USER VM shares the file system of the first file system; and duplicating the buffer cache into a buffer cache of a second FS VM generated on a hypervisor of a standby server.

The computer program further may perform managing, by the first FS VM, the buffer cache in a write-back manner.

The second FS VM may be generated by duplicating the first FS VM into the standby server.

Disposing the buffer cache may include receiving information about resources allocated to a file system; and allocating resources to the first FS VM according to the information about resources.

Disposing the buffer cache may include allocating a storage area of virtual memory of a size allocated to the FS VM based on a predetermined ratio, to the buffer cache according to the information about resources.

The hypervisor of the primary server and the hypervisor of the standby server may include hypervisor-based fault tolerance modules, respectively; and duplicating may include duplicating the buffer cache of the first FS VM into the buffer cache of the second FS VM using the fault tolerance module of the hypervisor of the primary server and the fault tolerance module of the hypervisor of the standby server.

Duplicating may include, when the USER VM invokes a data write call, loading write target data in the buffer cache of the first FS VM; loading the write target data in the buffer cache of the second FS VM via the fault tolerance module of the hypervisor of the primary server and the fault tolerance module of the hypervisor of the standby server; and, once the loading of the write target data in the buffer cache of the second FS VM has been completed, returning the data write call.

Duplicating may be performed by duplicating the FS VM generated on the primary server into the standby server.

The computer program may further perform adjusting the size of the buffer cache depending on the number of USER VMs generated on the primary server.

The computer program further performs adjusting a size of the buffer cache depending on a number of data write calls made by all USER VMs generated on the primary server.

The computer program may further perform requesting, by the first FS VM, the hypervisor of the primary server to cause data loaded in the buffer cache to be flushed based on at least one of the amount of I/O of the primary server and the amount of use of the buffer cache.

In order to accomplish the above objects, the present invention provides a method of duplicating a primary server into a primary server that is a fault tolerance partner of a standby server, including generating a first FS VM that provides a file system that is outsourced by a USER VM generated on a hypervisor of the primary server; generating a second FS VM that provides the file system that is outsourced by the USER VM that is duplicated on a hypervisor of the standby server; and duplicating a buffer cache that the first FS VM manages in conjunction with the file system into a buffer cache that the second FS VM manages in conjunction with the file system.

The hypervisor of the primary server and the hypervisor of the standby server may include hypervisor-based fault tolerance modules, respectively; and duplicating may include duplicating the buffer cache of the first FS VM into the buffer cache of the second FS VM using the fault tolerance module of the hypervisor of the primary server and the fault tolerance module of the hypervisor of the standby server.

The method may further include disposing, by the first FS VM and the second FS VM, the buffer caches in their respective pieces of virtual memory.

The hypervisor of the primary server and the hypervisor of the standby server may include hypervisor-based fault tolerance modules, respectively; and the duplicating may include duplicating the buffer cache by duplicating, by a fault tolerance module of a hypervisor of the primary server, the virtual memory of the first FS VM into the virtual memory of the second FS VM using the fault tolerance module of the hypervisor of the standby server.

The method may further include detecting a case in which data loaded in a buffer cache of the first FS VM has been lost before being flushed; and inactivating a state of the USER VM generated on the hypervisor of the primary server, and activating a state of the USER VM generated on the hypervisor of the standby server.

In order to accomplish the above objects, the present invention provides a server duplication system, including a primary server comprising a hypervisor including a hypervisor-based fault tolerance module and a first file system virtual machine (FS VM); and a first standby server comprising a hypervisor including a hypervisor-based fault tolerance module that exchanges data with a fault tolerance module provided on the hypervisor of the primary server and duplicates the primary server. The first FS VM provides a first file system that is shared by a USER VM generated on the hypervisor of the primary server, and disposes a buffer cache that is used in conjunction with the first file system on virtual memory allocated to the first FS VM, and the first FS VM is duplicated into the standby server using the hypervisor-based fault tolerance module of the primary server and the hypervisor-based fault tolerance module of the standby server.

The first FS VM may allocate a virtual volume to a partial area of virtual storage allocated to the first FS VM, and mount the first file system in the virtual volume.

The first FS VM may allocate a virtual volume to another partial area of the virtual storage allocated to the first FS VM, mount a second file system different from the first file system in the virtual volume, and provide the second file system that is shared by another USER VM generated on the hypervisor of the primary server.

The server duplication system may further include a second standby server including a hypervisor that includes a hypervisor-based fault tolerance module that duplicates the primary server by exchanging data with the fault tolerance module provided in the hypervisor of the primary server, and that duplicates the first standby server by exchanging data with the fault tolerance module provided in the hypervisor of the first standby server.

If the primary server crashes, all the USER VMs of the primary server may be inactivated, all the USER VMs of the second standby server may be activated, and the first standby server may be duplicated into the primary server.

In order to accomplish the above objects, the present invention provides a server duplication system, including a primary file comprising a first hypervisor configured to include a first server hypervisor-based fault tolerance module, and an FS VM generated on the first hypervisor; a primary service server comprising a second hypervisor configured to include a hypervisor-based fault tolerance module, and a USER VM generated on the second hypervisor; an auxiliary file server comprising a third hypervisor including a hypervisor-based fault tolerance module that duplicates the primary file server by exchanging data with a fault tolerance module provided in the first hypervisor; and an auxiliary service server comprising a fourth hypervisor including a hypervisor-based fault tolerance module that duplicates the primary service server by exchanging data with a fault tolerance module provided in the second hypervisor; wherein the FS VM provides a file system that is outsourced by a USER VM generated on the second hypervisor, and disposes a buffer cache used in conjunction with the file system, on virtual memory allocated to the first FS VM; wherein the FS VM is duplicated into the auxiliary file server using the fault tolerance module of the first hypervisor and the fault tolerance module of the third hypervisor; and wherein the USER VM is duplicated into the auxiliary service server using the fault tolerance module of the second hypervisor and the fault tolerance module of the fourth hypervisor.

The primary file server and the primary service server may be connected to each other via a cable that guarantees a predetermined bit transfer rate, and the auxiliary file server and the auxiliary service server may be connected to each other via a cable that guarantees a predetermined bit transfer rate.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
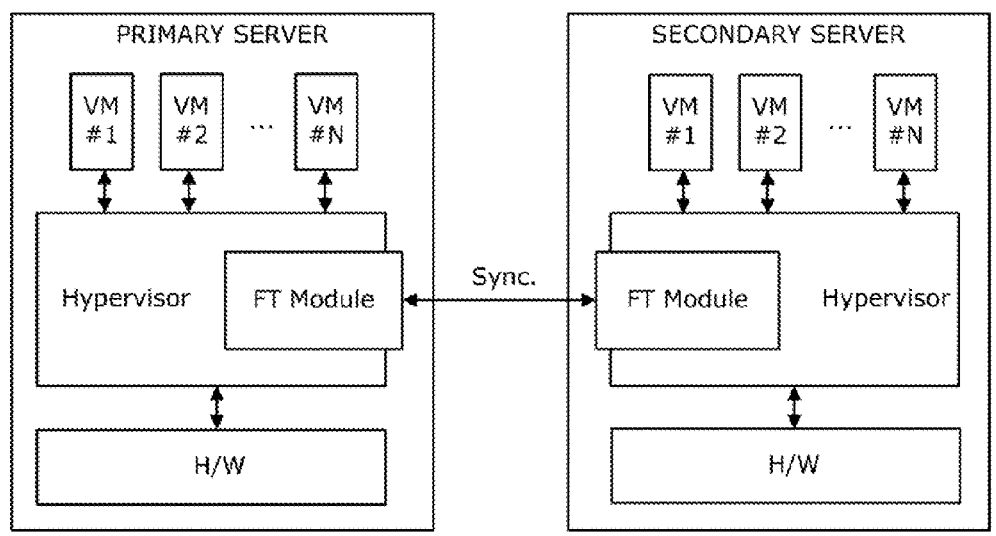
FIG. 1 is a diagram showing the configuration of a conventional hypervisor-based fault tolerance server duplication system.
Figure 2:
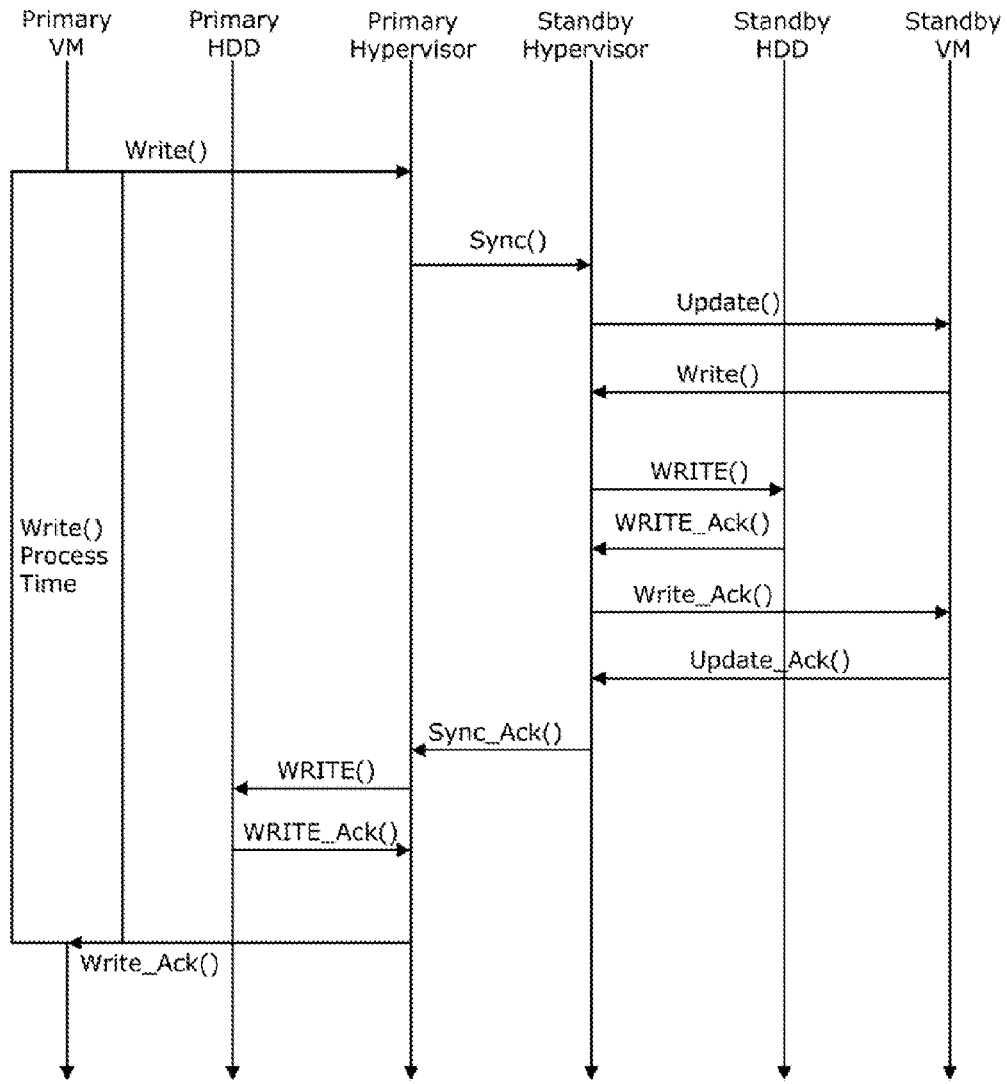
FIG. 2 is a signal flow diagram showing the processing of a data write call in the hypervisor-based fault tolerance server duplication system of FIG. 2.
Figure 3:
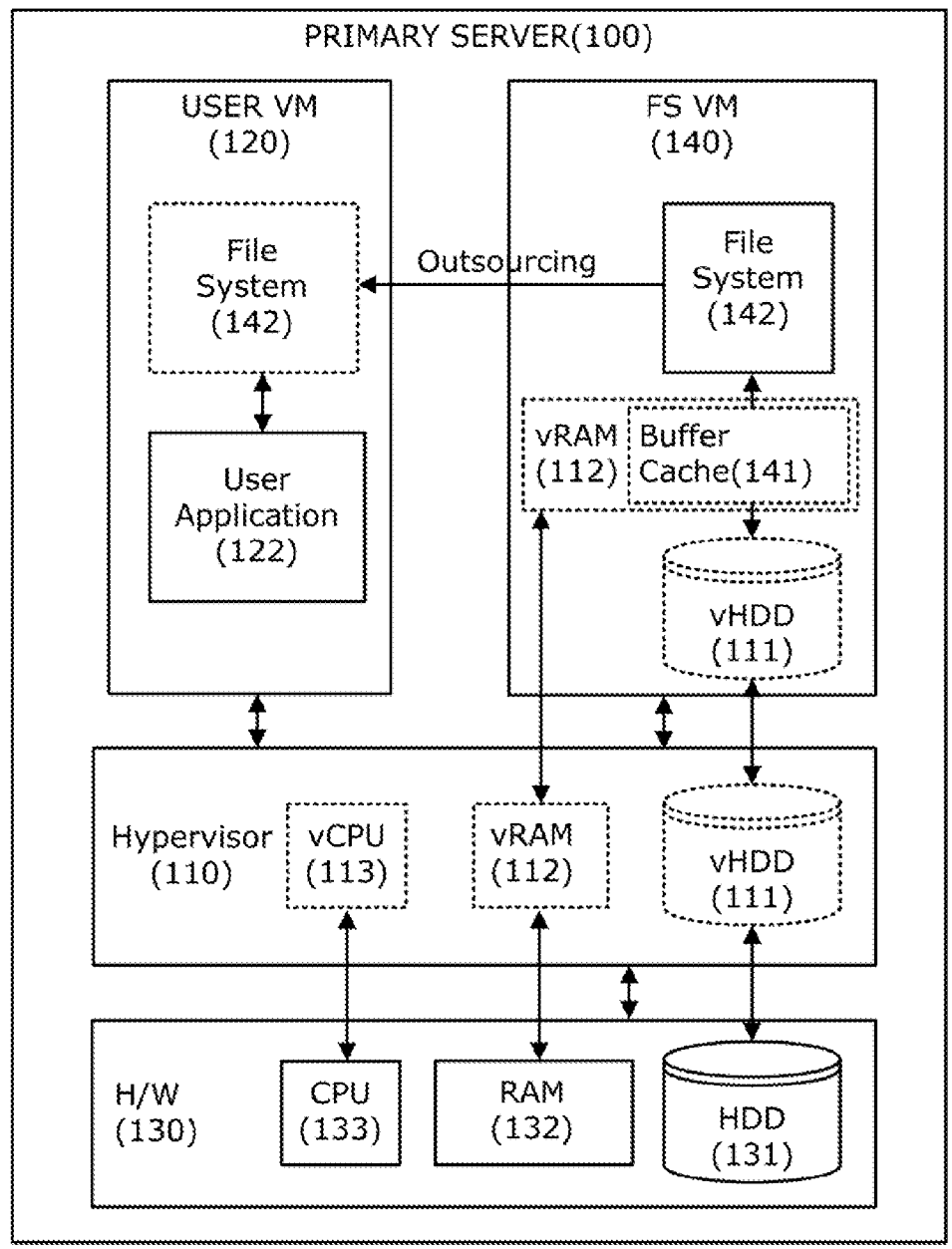
FIG. 3 is a block diagram of a virtual machine provision system in accordance with an embodiment of the present invention.

A virtual machine provision system in accordance with an embodiment of the present invention will be described with reference to FIGS. 3 to 7. As shown in FIG. 3, the virtual machine provision system in accordance with the embodiment of the present invention may be configured in the form of a single primary server 100. The virtual machine provision system in accordance with an embodiment of the present invention may include a File System Virtual Machine (FS VM) 140, a hypervisor 110, and hardware 130. The FS VM 140 and the hypervisor 110 may be software components that are implemented on the hardware 130.

The FS VM 140 is a virtual machine in a system area that operates in conjunction with the hypervisor 110. The FS VM 140 is provided with resources 131, 132 and 133 included in the hardware 130 of the primary server 100 via the hypervisor 110 in the form of virtual resources 111, 112 and 113. The FS VM 140 includes a file system module 142. The file system module 142 operates in conjunction with a virtual storage device 111. The file system module 142 uses a buffer cache 141 provided in the virtual memory 112 in conjunction with itself.

The file system module 142 may manage the buffer cache 141 in the form of a cache write-back cache. For example, the file system module 142, when a data write call is invoked, loads write target data in the buffer cache 141 and returns the write target data, rather than requesting that write target data be directly stored in the storage device 131 in a physical manner. Accordingly, if the file system module 142 is used, the time it takes to perform data write processing can be reduced.

The write target data loaded in the buffer cache 141 may be stored in the virtual storage device 111 at the time at which the buffer cache 141 is flushed. The hypervisor 110 physically stores data stored in the virtual storage device 111 in the storage device 131.

A user virtual machine (USER VM) 120 is also a virtual machine that is generated on the hypervisor 110. The USER VM 120 is a virtual machine that is generated in response to a user's request or some other necessity, and is different from the FS VM 140 that is a virtual machine in the system area. For example, the primary server 100 may generate the USER VM 120 on the hypervisor 110 under the control of an external control device. The USER VM 120 may be allocated at least part of the hardware resource 130 of the primary server 100 via the hypervisor 110.

A user application executable on the USER VM 120 is executed using the virtual resource that is allocated to the USER VM 120.

In accordance with this embodiment, the USER VM 120 generated on the hypervisor 110 uses the file system module 142 provided in the FS VM 140 in an outsourcing manner. For example, the USER VM 120 may mount and use the file system module 142 provided in the FS VM 140 in the form of a network drive or the like.

Meanwhile, the USER VM 120 may be considered to share the file system of the FS VM 140 in that the USER VM 120 is construed to share the file system module 142 provided in the FS VM 140 with another USER VM 120.

Since the file system module 142 provides a rapid data write function using the buffer cache 141, this embodiment has the advantage of increasing the data write speed by compelling the USER VM 120 to use the file system module 142.

Figure 4:
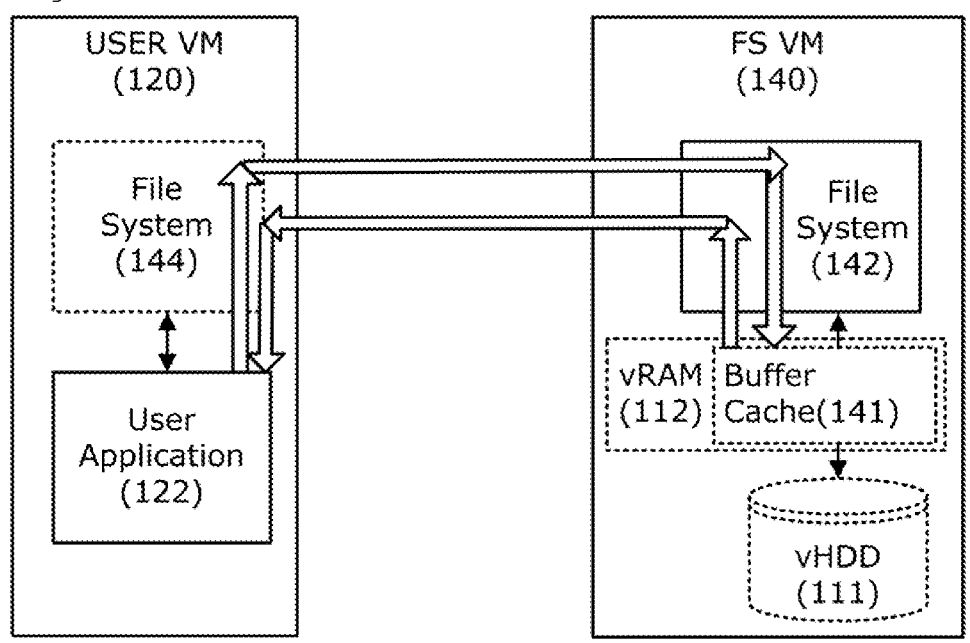
FIG. 4 is a conceptual diagram showing the operation of writing data in the virtual machine provision system of FIG. 3.

FIG. 4 shows a flow that is followed until a data write function is returned when the user application 122 that is executed on the USER VM 120 that outsources the file system module 142 invokes the data write function.

First, when the user application 122 invokes a data write function, a low-level write call provided by the file system module 142 of the FS VM 140 is invoked. The file system module 142 only loads write target data in the buffer cache 141, and immediately returns the low-level write call. Since the buffer cache 141 is located on the virtual memory 112, the loading refers to a memory loading task. Accordingly, it may be performed at high speed to load data in the buffer cache 141. As a result, writing data using the file system module 142 is performed at higher speed than in a case in which the USER VM 120 directly writes data via the hypervisor 110.

In accordance with an embodiment, the USER VM 120 generated in the hypervisor 110 may implement and use a file system in addition to the file system module 142 provided in the FS VM 140 in order to achieve scalability.

Since the buffer cache 141 also performs a general-purpose caching function, the advantage is achieved that the read speed is increased when data that was previously read is read again. Accordingly, the virtual machine provision system 100 in accordance with an embodiment of the present invention has the advantage of increasing speed because it can process the data input and output of the USER VM 120 via the FS VM 140 of the file system module 142 in an integrated manner.

Figure 5:
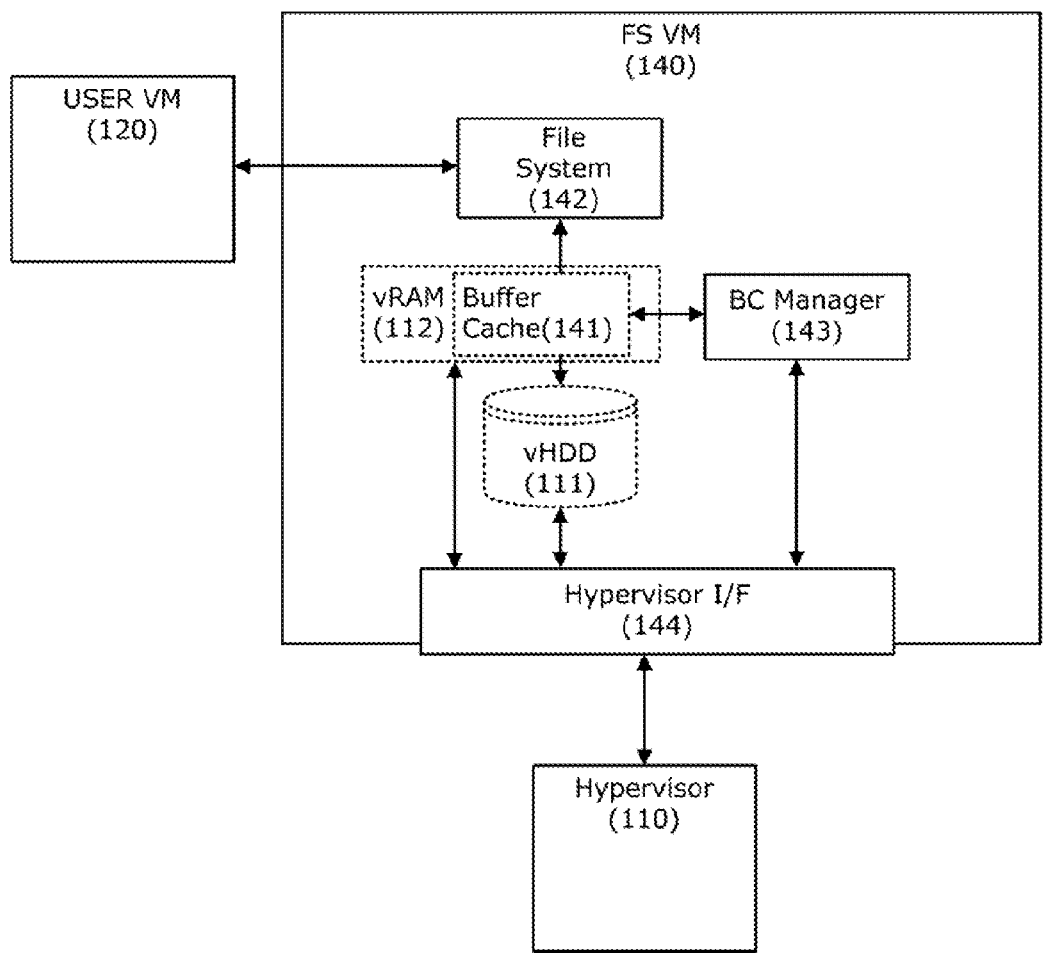
FIG. 5 is a block diagram of the FS VM of FIG. 3.

The configuration of the FS VM 140 will be described in greater detail below with reference to FIG. 5.

Since the FS VM 140 is also a virtual machine that operates on the hypervisor 110, the FS VM 140 includes the hypervisor interface 144 that performs interfacing with the hypervisor 110. The FS VM 140 may use the virtual resource allocated to the FS VM 140 via the hypervisor interface 144.

As described above, the FS VM 140 includes the file system module 142. The file system module 142 may be software components that are executed on a virtual CPU allocated to the FS VM 140. The file system module 142 operates in conjunction with the buffer cache 141 located in the virtual memory 112 allocated to the FS VM 140.

The FS VM 140 may include a buffer cache manager 143. The buffer cache manager 143 may also be software components that are executed on the virtual CPU allocated to the FS VM 140. The buffer cache manager 143 may control the flushing of the buffer cache. For example, the buffer cache manager 143 may be provided with data about the overall input and output operation load of the primary server 140 by the hypervisor interface 144, and may control whether to perform flushing based on the amount of load. The buffer cache manager 143 may also control whether to perform flushing while further taking into consideration the amount of data loaded in the buffer cache.

The FS VM 140 may provide respective file systems to two or more USER VMs 1200 and 1210.

The USER VMs 1200 and 1210 should have respective dedicated file systems. In order to meet this need, the FS VM 140 may divide the virtual storage device 111 provided via the hypervisor 110 into a plurality of virtual volumes, and may provide respective file systems mounted in the virtual volumes to the USER VMs 1200 and 1210.

Figure 6:
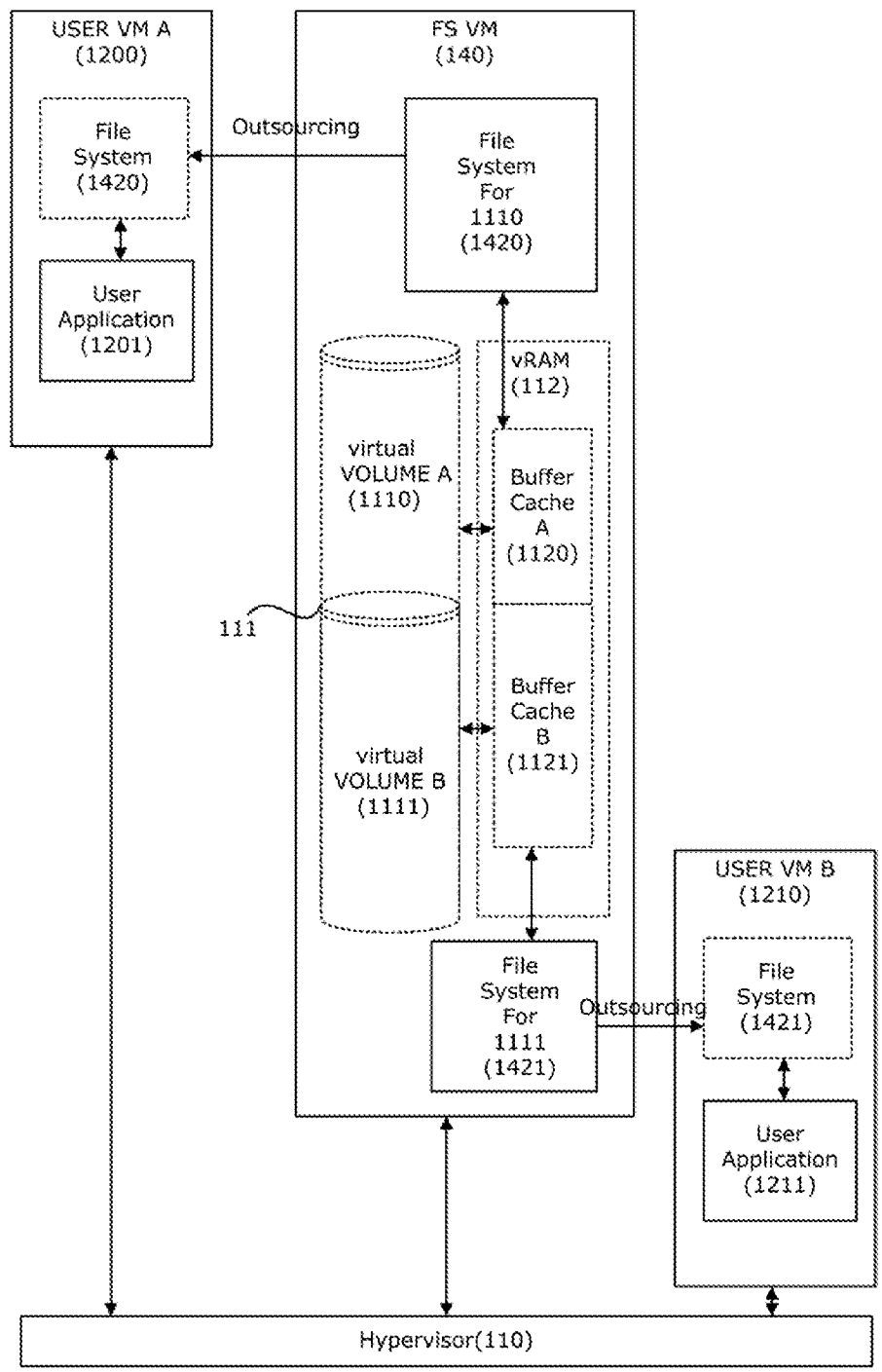
FIG. 6 is a conceptual diagram illustrating that the FS VM of FIG. 3 provides file systems to two virtual machines.

As shown in FIG. 6, USER VM A 1200 may outsource the file system 1420 mounted in virtual volume A 1110, and USER VM B 1210 may outsource the file system 1421 mounted in virtual volume B 1111.

As shown in FIG. 6, virtual volume A 1110 and virtual volume B 1111 have storage areas that do not overlap each other. That is, the FS VM 140 provides USER VM A 1200 and USER VM B 1210 with the independent virtual storage volumes that do not have an influence of data input and output on each other.

Although only the two USER VMs have been illustrated in FIG. 6, one or more USER VMs may be generated in some embodiments. Whenever a USER VM is generated, a volume may be allocated to the remaining virtual storage, and a new file system may be mounted in the allocated volume and provided to the newly generated USER VM in an outsourcing manner.

Figure 7:
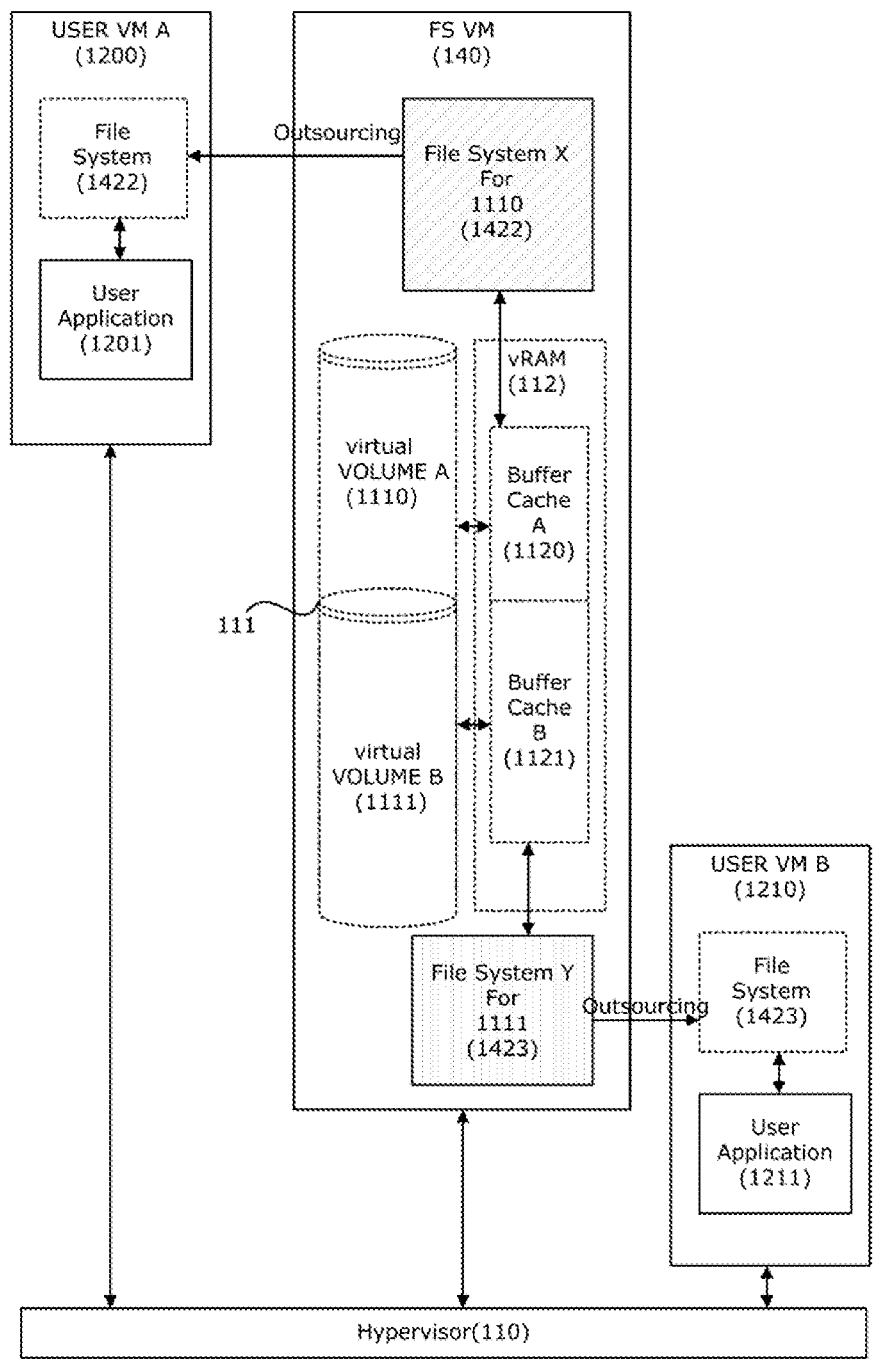
FIG. 7 is a conceptual diagram illustrating that the FS VM of FIG. 3 provides different file systems to two virtual machines.

Meanwhile, the FS VM 140 in accordance with this embodiment may provide different types of file systems. As shown in FIG. 7, USER VM A 1200 may outsource a file system X mounted on virtual volume A 1110, and USER VM B 1210 may outsource a file system Y mounted on virtual volume B 1111. For example, the FS VM 140 may use one or more of known file systems, including FAT32, NTFS, ext2, raiserFS, ext3, etc.

A hypervisor-based server duplication system in accordance with another embodiment of the present invention will be described with reference to FIGS. 8 and 9.

Figure 8:
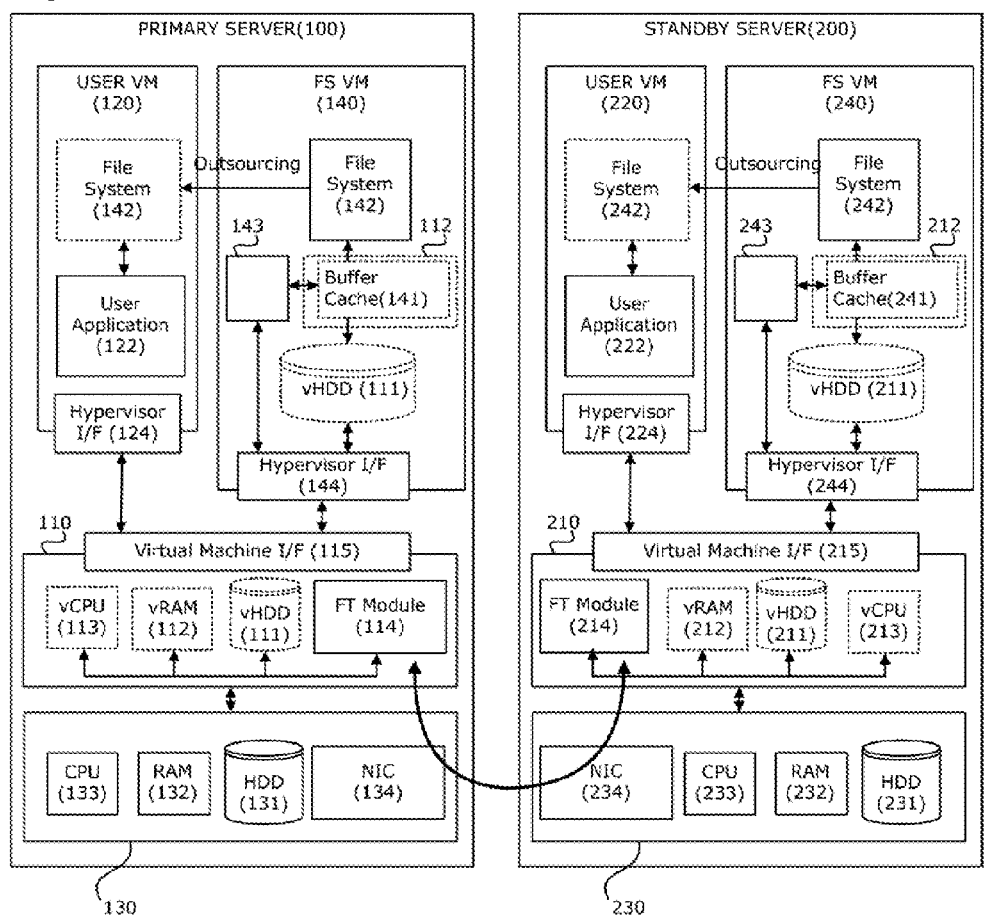
FIG. 8 is a block diagram of a hypervisor-based server duplication system in accordance with an embodiment of the present invention.
Figure 9:
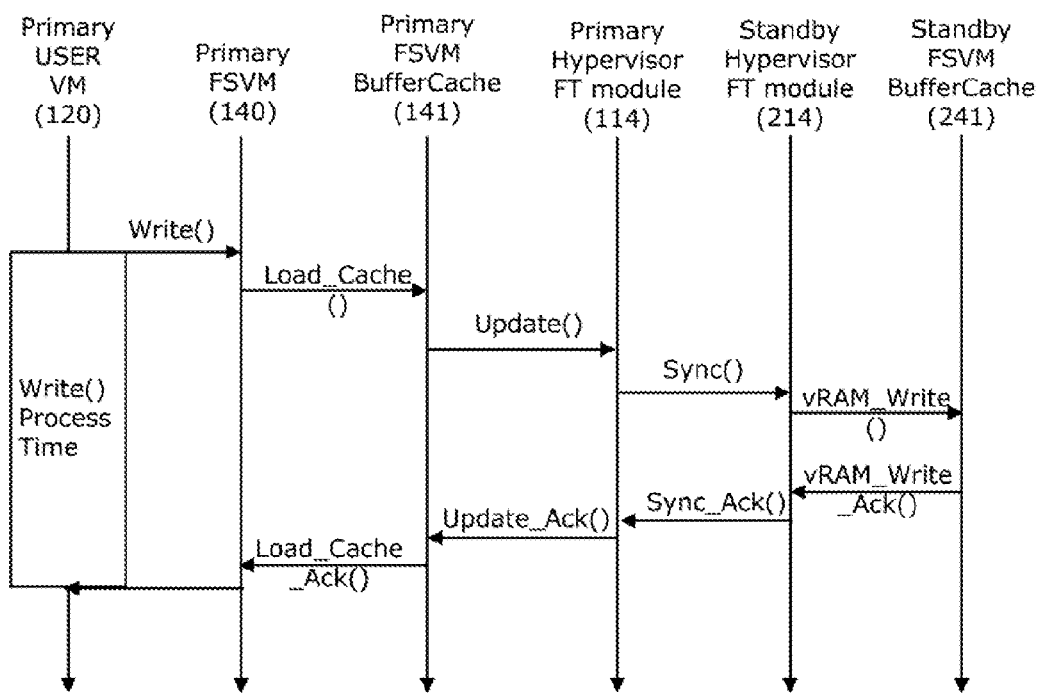
FIG. 9 is a signal flow diagram showing the operation of writing data in the hypervisor-based fault tolerance server duplication system of FIG. 8.

As shown in FIG. 8, the hypervisor-based server duplication system in accordance with the embodiment of the present invention may include a primary server 100 and a standby server 200. The standby server 200 should operate in an environment that is safe from the failure of the primary server 100, and thus it is preferred that the standby server 200 be installed in another rack or located in another server operation site.

The primary server 100 illustrated in FIG. 8 includes, in addition to the configurations of the primary server 100 illustrated with reference to FIGS. 3 to 7, additional configurations that will be described below. That is, the primary server 100 included in the hypervisor-based server duplication system in accordance with the embodiment of the present invention has the configuration of the primary server 100 described with reference to FIGS. 3 to 7, performs the operation of the primary server 100 described with reference to FIGS. 3 to 7, and additionally performs a duplication-related operation.

First, the hypervisor 110 further includes a fault tolerance module 114. The fault tolerance module 114 of the primary server 100 operates in conjunction with the fault tolerance module 214 of the standby server 200 via the network Internet cards 134 and 234 of the primary server 100 and the standby server 200 so that the virtual resources 111, 112 and 113 of the primary server 100 are duplicated as the virtual resources 211, 212 and 213 of the standby server 200.

Second, the buffer cache manager 143 performs an additional function. The buffer cache manager 143 additionally performs the function of requesting an update from the fault tolerance module 114 of the primary server 100 via the hypervisor interface 144 and the virtual machine interface 115 when an update occurs in the data loaded in the buffer cache 141, in addition to the flushing-related control of the buffer cache 141.

A process that is performed by the hypervisor-based server duplication system in accordance with an embodiment of the present invention in order to process a date write operation that is requested by the user application 122 that is executed on the USER VM 120 of the primary server 100 will be described with reference to FIG. 9.

First, the data write function invoked by the user application 122 is transferred to the FS VM 140, and the file system module 142 loads write target data in the buffer cache 141. The loading may be loading the write target data in a memory area designated as the area of the buffer cache 141. The buffer cache manager 143 may detect such loading by monitoring the buffer cache 141, and may be notified of such loading by the file system module 142.

If the buffer cache manager 143 detects or is notified of such loading, the buffer cache manager 143 may request an update of the write target data loaded in the fault tolerance module 114 of the primary server 100 via the hypervisor interface 144 and the virtual machine interface 115.

The fault tolerance module 114 of the primary server 100 that has received the request requests synchronization from the fault tolerance module 214 of the standby server 200, and the fault tolerance module 214 of the standby server 200 duplicates the data loaded in the buffer cache 141 of the primary server 100 into the buffer cache 241 of the standby server 200 by incorporating the update of the data included in the area of the buffer cache 141 of the virtual memory 112.

Once the duplication has been terminated, the control is turned to the user application 122 that is executed on the USER VM 120 of the primary server 100 via the fault tolerance module 214 of the standby server 200, the fault tolerance module 114 of the primary server 100, and the file system module 142 of the primary server 100.

In accordance with this embodiment, it is sufficient if data is loaded in the buffer caches of the primary server 100 and the standby server 200, and therefore the advantage is achieved that data is rapidly written. Furthermore, write target data is loaded in the buffer cache 241 of the standby server 200 as soon as the write target data is loaded in the buffer cache 141 of the primary server 100, and the write target data loaded in the buffer caches 141 and 241 is physically written on the storage devices 131 and 231 by the buffer cache managers 143 and 243 at an appropriate time, and therefore the advantage is achieved that data stored in the storage device 131 of the primary server 100 is also stored in the storage device 231 of the standby server 200 to achieve safety.

Figure 10:
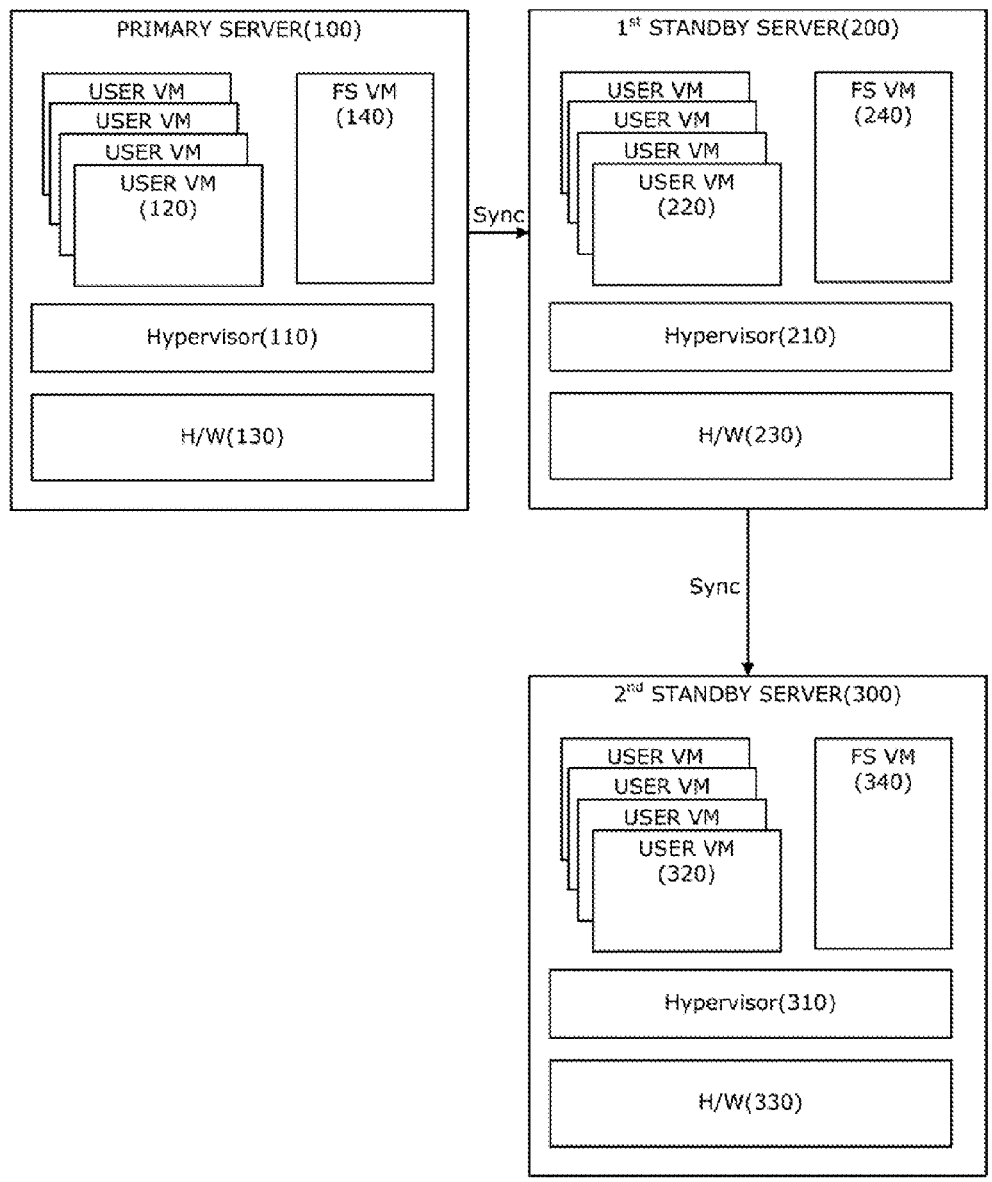
FIG. 10 is a block diagram of a hypervisor-based server duplication system in accordance with another embodiment of the present invention.

FIG. 10 is a block diagram of a hypervisor-based server duplication system in accordance with another embodiment of the present invention. As shown in FIG. 10, the hypervisor-based server duplication system in accordance with this embodiment of the present invention includes a primary server 100, a first standby server 200, and a second standby server 300. That is, the system shown in FIG. 10 further includes a standby server 300, compared to the system shown in FIG. 9. Normally, the resources of the primary server 100 are duplicated into the first standby server 200, and also into the second standby server 300. The second standby server 300 may duplicate the primary server 100 or the first standby server 200. That is, the first standby server 300 may include a hypervisor, including a hypervisor-based fault tolerance module that duplicates the primary server 100 by exchanging data with the fault tolerance module 114 provided in the hypervisor 110 of the primary server 100, or that duplicates the first standby server 200 by exchanging data with a fault tolerance module 214 provided in the hypervisor 210 of the first standby server 200.

Figure 11:
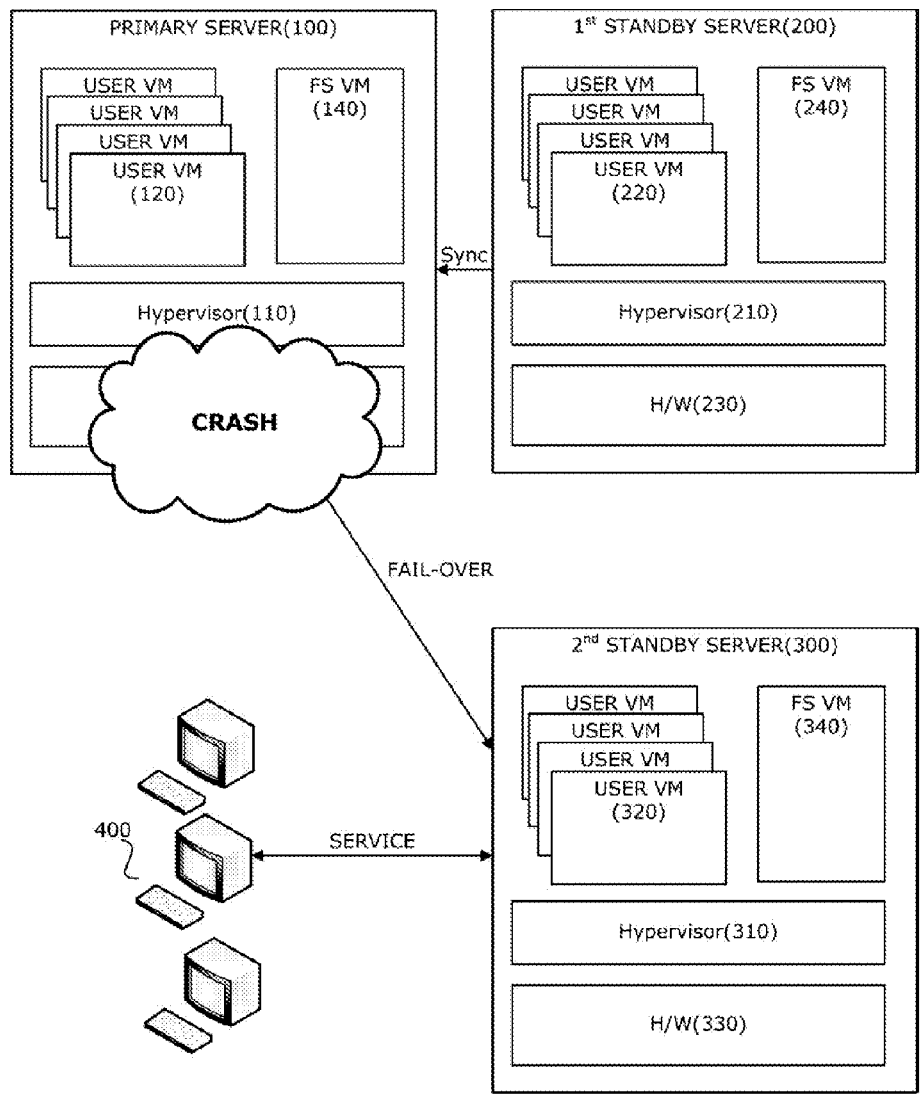
FIG. 11 is a conceptual diagram illustrating a recovery operation in the hypervisor-based server duplication system of FIG. 10.

FIG. 11 is a conceptual diagram illustrating the recovery operation of the hypervisor-based server duplication system shown in FIG. 10. As shown in FIG. 11, when the primary server 100 crashes, the first standby server 200 performs the operation of recovering the primary server 100, and the second standby server 300 provides service during the recovery. Accordingly, the terminal 400 can receive uninterrupted service without a reduction in speed even when the primary server 100 crashes. That is, when a crash occurs in the primary server 100, the overall USER VM 120 of the primary server 100 is inactivated, the overall USER VM 320 of the second standby server 300 is activated, and the first standby server 200 may be duplicated as the primary server 100.

Figure 12:
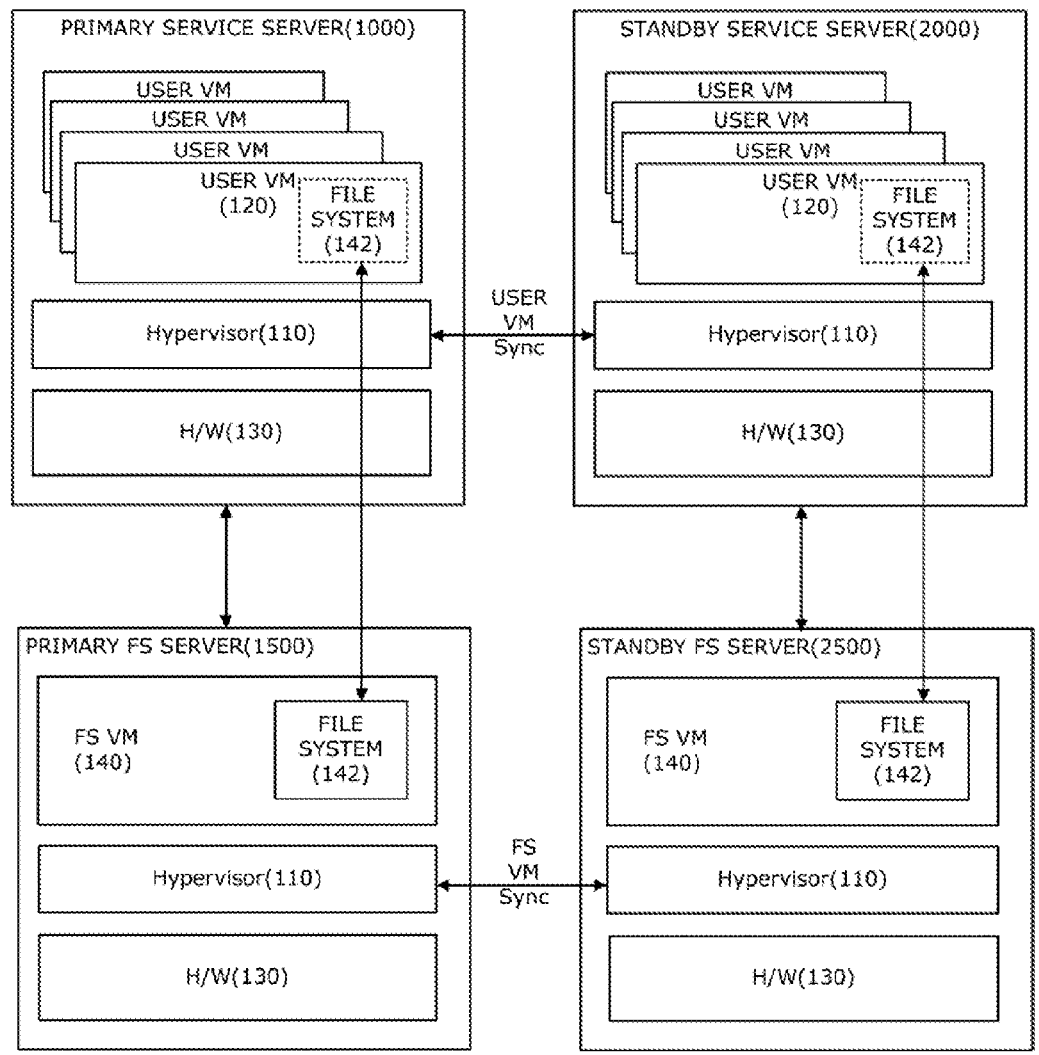
FIG. 12 is a block diagram of a hypervisor-based server duplication system in accordance with still another embodiment of the present invention.

FIG. 12 is a block diagram of a hypervisor-based server duplication system in accordance with still another embodiment of the present invention. As shown in FIG. 12, the hypervisor-based server duplication system in accordance with this embodiment of the present invention may include FS VMs 140 in servers separate from USER VMs 120. When the FS VMs 140 are provided on the servers separate from the USER VMs 120, data input and output performance can be prevented from being reduced by the influence of the resource consumption of the USER VMs 120 on the FS VMs 140.

The hypervisor-based server duplication system in accordance with this embodiment of the present invention may include a primary service server 1000, a primary file server 1500, a standby service server 2000, and a standby file server 2500. In order to prevent the data input and output speed from being reduced because the USER VM 120 and the file server virtual machine 140 perform communication at high speed, it is preferred that the primary service server 1000 and the primary file server 1500 be connected via a cable that guarantees a predetermined bit transfer rate and the auxiliary service server 2000 and the auxiliary file server 2500 be connected via a cable that guarantees a predetermined bit transfer rate.

The primary file server 1500 includes a hypervisor 110 including a hypervisor-based fault tolerance module, and an FS VM 140 generated on the hypervisor 110.

The primary service server 1000 includes a hypervisor 110 including a hypervisor-based fault tolerance module, and a USER VM 120 generated on the hypervisor 110.

The auxiliary file server 2500 includes a hypervisor 110, including a hypervisor-based fault tolerance module that duplicates the primary file server 1500 by exchanging data with a fault tolerance module provided in the primary file server 1500 of the hypervisor 110.

The auxiliary service server 2000 includes a hypervisor 110, including a hypervisor-based fault tolerance module that duplicates the primary service server 1000 by exchanging data with a fault tolerance module provided in the hypervisor 110 of the primary service server 1000.

In this case, the FS VM 140 provides a file system 142 that is outsourced by the USER VM 120 generated on the hypervisor 110 of the primary service server 1000, and disposes a buffer cache used in conjunction with the file system 142 on virtual memory allocated to the FS VM 140. Furthermore, the FS VM 140 is duplicated into the auxiliary file server 2500 using the fault tolerance module of the hypervisor 110 of the primary file system server 1500 and the fault tolerance module of the hypervisor 110 of the auxiliary file system server 2500. Furthermore, the USER VM 120 of the primary service server 1000 is duplicated into the auxiliary service server 2000 using the fault tolerance module of the hypervisor 110 of the primary service server 1000 and the fault tolerance module of the hypervisor 110 of the standby service server 2000.

Figure 13:
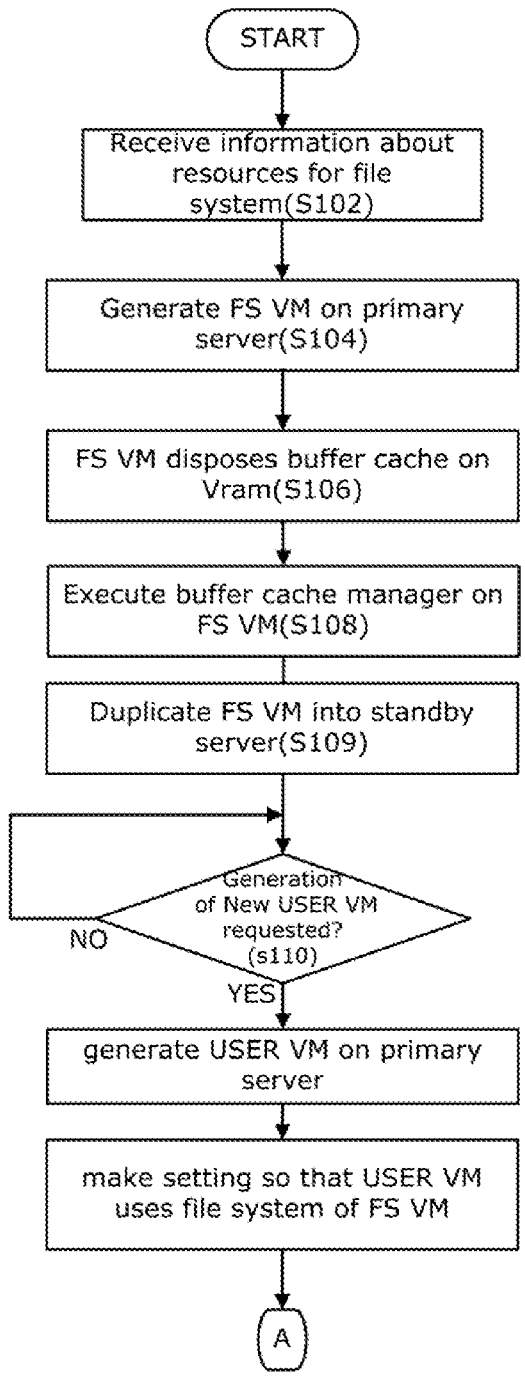
FIGS. 13 to 14 are flowcharts of a hypervisor-based server duplication method in accordance with an embodiment of the present invention.
Figure 14:
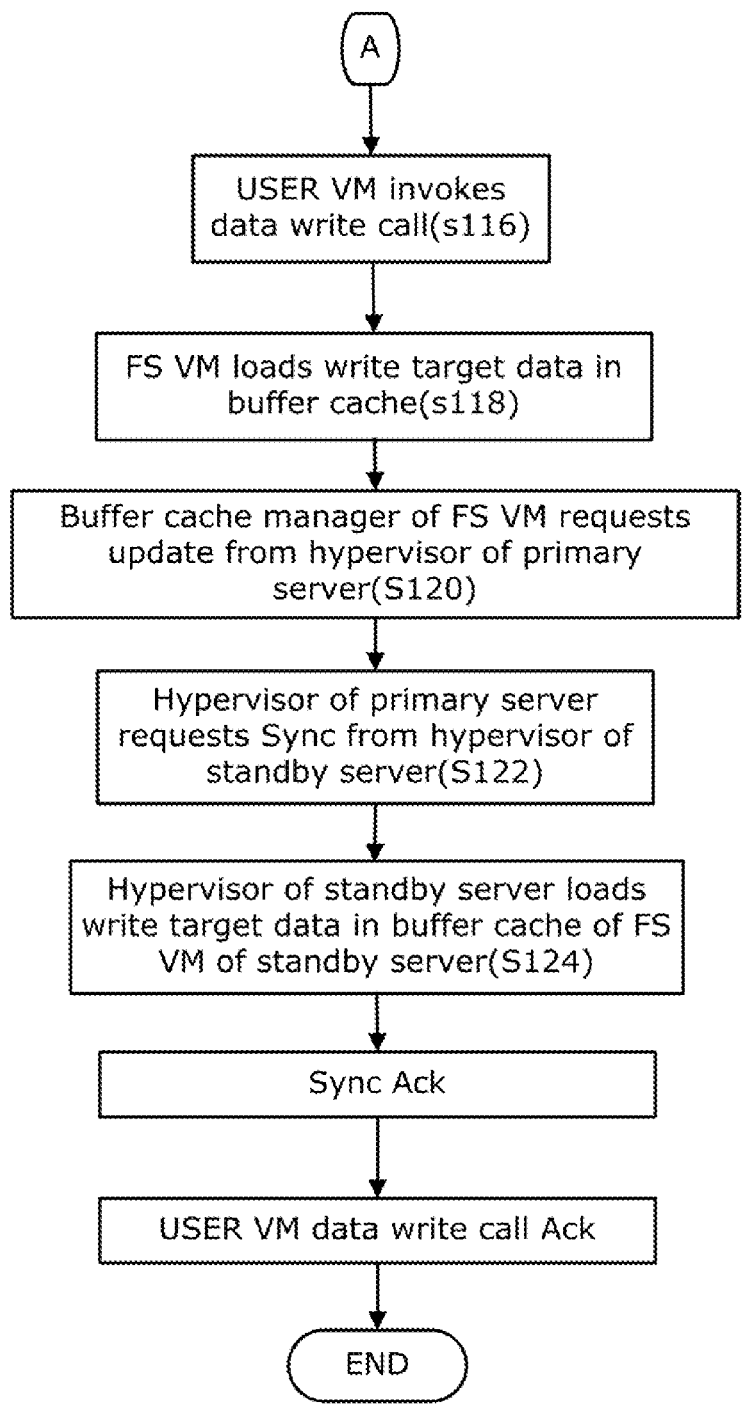

FIGS. 13 to 14 are flowcharts of a hypervisor-based server duplication method in accordance with an embodiment of the present invention.

First, FIG. 13 is a flowchart showing a method of performing initialization so that the hypervisor-based server duplication method in accordance with the embodiment of the present invention is performed.

First, information about resources that will be used by a file system is received at step S102. For example, information, such as the number of CPU cores, memory size and storage size to be used, may be input.

Thereafter, based on the information about the resources, an FS VM is generated on the hypervisor of the primary server at step S104. In accordance with an embodiment, resources may be allocated to the FS VM generated on the hypervisor of the primary server, based on the information about resources.

At least part of the virtual memory allocated to the FS VM may be used as a buffer cache at step S106. For example, the previously designated address area of the virtual memory allocated to the FS VM may be allocated as the area of the buffer cache. In accordance with an embodiment, the storage area of the virtual memory of a size allocated to the FS VM based on a predetermined ratio may be allocated as the area of the buffer cache. In accordance with another embodiment, information about the size of the area of the buffer cache may be included in information about the resources, and the area of the buffer cache may be allocated according to the information about the resources. Furthermore, in accordance with another embodiment, the size of the buffer cache may be automatically adjusted according to the number of USER VMs generated on the primary server. Furthermore, in accordance with another embodiment, the size of the buffer cache may be automatically adjusted according to the quantity of data write calls that are made by all USER VMs generated on the primary server.

Thereafter, the buffer cache manager is executed on the FS VM at step S108. As described already, the buffer cache manager request the fault tolerance module of the hypervisor to duplicate data loaded in the buffer cache into the standby server.

Thereafter, the FS VM of the primary server is duplicated into the standby server. The duplication of the FS VM may be performed using the fault tolerance module of the primary server and the fault tolerance module of the standby server.

Thereafter, if there is a request for the generation of a new USER VM at step S110, the new USER VM is generated on the hypervisor of the primary server at step S112.

Thereafter, a setting is made such that the USER VM outsources the file system of the FS VM at step S114. For example, the file system of the FS VM mounted in the virtual volume allocated to the USER VM may be installed in the USER VM, or a network drive provided by the USER VM may be connected to the USER VM.

Next, referring to FIG. 14, a process in which the USER VM of the primary server that outsources a file system provided by the FS VM of the primary server write data and write target data is duplicated will be described.

In accordance with an embodiment, the write target data may be duplicated by duplicating the buffer cache of the FS VM of the primary server into the buffer cache of the second FS VM using the fault tolerance module of the hypervisor of the primary server and the fault tolerance module of the hypervisor of the standby server.

In accordance with an embodiment, the write target data may be handled by duplicating the FS VM generated in the primary server into the standby server.

If the USER VM of the primary server invokes a data write call at step S116, a low-level write call is also invoked in the file system module of the FS VM. The low-level write call loads the write target data in the buffer cache of the FS VM at step S118.

The buffer cache manager of the FS VM that has detected the loading requests an update from the hypervisor of the primary server at step S120, and the hypervisor of the primary server requests synchronization from the hypervisor of the standby server at step S122. Furthermore, the hypervisor of the standby server loads the write target data in the buffer cache of the standby server at step S124. As soon as the loading of the write target data in the buffer cache of the standby server is completed, the request for synchronization and the low-level write function on the primary server of the file system are returned at step S126, so that the USER VM regains the control of the primary server at step S128, and performs a subsequent operation.

After the write target data has been loaded in the buffer cache, the FS VM may request the hypervisor of the primary server to cause the data loaded in the buffer cache to be flushed based on at least one of the amount of I/O of the primary server and the amount of use of the buffer cache.

Although not shown in FIGS. 13 and 14, the FS VM may detect a case in which the write target data loaded in the buffer cache has been lost before being physically written by being flushed into a storage device, and then allow service to be provided via the standby server. For example, if the data loaded in the buffer cache of the primary server is lost before being stored in the storage device, it may be possible to inactivate the state of the USER VM generated on the hypervisor of the primary server and activate the state of the USER VM generated on the hypervisor of the standby server.

The present invention may be implemented as computer-readable code on a computer-readable storage medium. The storage medium includes all types of recording devices on which data can be stored. Examples of the storage medium include read-only memory (ROM), random-access memory (RAM), compact disk (CD)-ROM, magnetic tape, hard discs, floppy discs, flash memory, optical data storage devices, and even carrier waves (as in the case of transmission over the Internet). Moreover, the storage medium may be distributed among computer systems that are interconnected through a network, and computer-readable code may be stored and implemented in a distributed manner.

The hypervisor-based duplication method in accordance with still another embodiment of the present invention may include generating the FS VM of the standby server upon initialization, rather than generating the FS VM of the standby server by duplicating the FS VM of the primary server. This embodiment prevents an FS VM from being not generated on the standby server because of an error in the duplication of the FS VM, thereby achieving the advantage of enabling duplication-related settings to be safely performed. The duplication method in accordance with an embodiment of the present invention will now be described.

First, a first FS VM that provides a file system that is outsourced by the USER VM generated on the hypervisor of the primary server is generated.

Thereafter, a second FS VM that provides the file system that is outsourced by the USER VM duplicated into the hypervisor of the standby server is generated.

Thereafter, a buffer cache that the first FS VM manages in conjunction with the file system is duplicated into a buffer cache that the second FS VM manages in conjunction with the file system. As described already, the hypervisor of the primary server and the hypervisor of the standby server may include hypervisor-based fault tolerance modules, respectively, and the duplication may means that the buffer cache of the first FS VM into the second FS VM using the fault tolerance module of the hypervisor of the primary server and the fault tolerance module of the hypervisor of the standby server.

The buffer caches may be disposed on pieces of virtual memory by the first and second FS VMs. Here, the hypervisor of the primary server and the hypervisor of the standby server may include hypervisor-based fault tolerance modules, respectively, and the duplication may mean the duplication of the buffer cache that is performed in such a way that the fault tolerance module of the hypervisor of the primary server duplicates the virtual memory of the first FS VM into the virtual memory of the second FS VM using the fault tolerance module of the hypervisor of the standby server.

Furthermore, the duplication method in accordance with this embodiment of the present invention may further include the steps of, if a case in which the data loaded in the buffer cache of the first FS VM has been lost before being flushed is detected, inactivating the state of USER VM generated on the hypervisor of the primary server and activating the state of USER VM generated on the hypervisor of the primary server.

The present invention has the advantage of increasing the response speed when a VM invokes a file input/output call upon duplicating a server in which one or more VMs have been generated on a hypervisor.

Furthermore, the present invention has the advantage of enabling the FS VM to manage disk tasks having the lowest response speed (performance) of the resources on the hypervisor in an integrated manner. That is, the present invention has the advantage of improving the performance of all VMs because a bottleneck phenomenon is eliminated by scheduling the disk I/O tasks of all the VMs on a hypervisor.

Furthermore, the present invention has the advantage of not only improving performance but also providing a price benefit attributable to the selection of a product suitable for characteristics because when an FSVM is constructed in a different physical server, the FSVM can be constructed in a physical server having excellent disk performance and a USER VM can be constructed in a physical server having excellent CPU and memory performance.

Furthermore, the present invention has the advantage of not only enabling a plurality of VMs to use respective file systems but also improving I/O performance in an environment in which a fault tolerance solution is utilized based on the plurality of VMs in a single physical server.

Furthermore, the present invention has the advantage of being implemented based on an existing hypervisor and fault tolerance solution without changes in configuration.

Furthermore, the present invention has the advantage of implementing a buffer cache using low-cost RAM.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A method for hypervisor-based server duplication comprising:
    providing a hypervisor of a primary server and a hypervisor of a standby server each comprising a corresponding fault tolerance module;
    generating a first file system virtual machine (FS VM) on the hypervisor of the primary server;
    installing a file system in the first FS VM, and
    disposing a buffer cache operating in conjunction with the file system installed in the first FS VM, in virtual memory allocated to the first FS VM;
    generating a user virtual machine (USER VM) on the hypervisor of the primary server so that the USER VM shares the file system of the first file system; and
    duplicating, by the fault tolerance module of the primary server, the buffer cache of the first FS VM into a buffer cache of a second FS VM generated on the hypervisor of a standby server.

2. The method of claim 1, further comprising:
    managing, by the first FS VM, the buffer cache in a write-back manner.

3. The method of claim 1, wherein the second FS VM is generated by duplicating the first FS VM into the standby server.

4. The method of claim 1, wherein the duplicating comprises:
    duplicating the buffer cache of the first FS VM into the buffer cache of the second FS VM using the fault tolerance module of the hypervisor of the primary server and the fault tolerance module of the hypervisor of the standby server.

5. The method of claim 4, wherein the duplicating further comprises:
    when the USER VM invokes a data write call, loading write target data in the buffer cache of the first FS VM;
    loading the write target data in the buffer cache of the second FS VM via the fault tolerance module of the hypervisor of the primary server and the fault tolerance module of the hypervisor of the standby server; and
    once the loading of the write target data in the buffer cache of the second FS VM has been completed, returning the data write call.

6. The method of claim 1, wherein the duplicating is performed by duplicating the FS VM generated on the primary server into the standby server.

7. The method of claim 1, further comprising:
    adjusting a size of the buffer cache depending on a number of user virtual machines (USER VMs) generated on the primary server.

8. The method of claim 1, further comprising:
    adjusting a size of the buffer cache depending on a number of data write calls made by all USER VMs generated on the primary server.

9. The method of claim 1, further comprising:
requesting, by the first FS VM, the hypervisor of the primary server to cause data loaded in the buffer cache to be flushed based on at least one of an amount of I/O of the primary server and an amount of use of the buffer cache.

10. A method of duplicating a primary server into a standby server that is a fault tolerance partner of a primary server, comprising:
generating a first FS VM on a hypervisor of the primary server that provides a file system that is outsourced by a USER VM generated on the hypervisor of the primary server;
generating a second FS VM on a hypervisor of the standby server that provides the file system that is outsourced by the USER VM that is duplicated on the hypervisor of the standby server; and
duplicating a buffer cache that the first FS VM manages in conjunction with the file system, into a buffer cache that the second FS VM manages in conjunction with the file system,
wherein the respective hypervisor of the primary server and the respective hypervisor of the standby server comprise hypervisor-based fault tolerance modules, respectively.

11. The method of claim 10, wherein:
the duplicating of the first buffer cache comprises duplicating the first buffer cache of the first FS VM into the second buffer cache of the second FS VM using the fault tolerance module of the hypervisor of the primary server and the fault tolerance module of the hypervisor of the standby server.

12. The method of claim 10, wherein:
the duplicating of the first buffer cache comprises duplicating, by a respective fault tolerance module of the primary server, the respective virtual memory of the first FS VM into the respective virtual memory area of the second FS VM using the respective fault tolerance module of the respective hypervisor of the standby server.

13. A server duplication system, comprising:
a primary server comprising a hypervisor including a hypervisor-based fault tolerance module and a first file system virtual machine (FS VM); and
a first standby server comprising a hypervisor including a hypervisor-based fault tolerance module that exchanges data with a fault tolerance module provided on the hypervisor of the primary server and duplicates the primary server;
wherein the first FS VM provides a first file system that is shared by a USER VM generated on the hypervisor of the primary server, and disposes a buffer cache that is used in conjunction with the first file system on virtual memory allocated to the first FS VM; and
wherein the first FS VM is duplicated into the standby server using the hypervisor-based fault tolerance module of the primary server and the hypervisor-based fault tolerance module of the standby server, by duplicating the buffer cache of the first FS VM into a buffer cache of a second FS VM generated on the hypervisor of the first standby server.

* * * * *